(12) United States Patent
Taylor et al.

(10) Patent No.: US 11,818,246 B2
(45) Date of Patent: Nov. 14, 2023

(54) BLOCKCHAIN DATA STRUCTURES AND SYSTEMS AND METHODS THEREFOR FOR MULTIPATH TRANSACTION MANAGEMENT

(71) Applicant: Onclave Networks, North McLean, VA (US)

(72) Inventors: James Taylor, Sterling, VA (US); Conor Haegley, Virginia Beach, VA (US); Joseph Lawn, Arlington, VA (US)

(*) Notice: Subject to any disclaimer, the term of this patent is extended or adjusted under 35 U.S.C. 154(b) by 186 days.

(21) Appl. No.: 17/111,827

(22) Filed: Dec. 4, 2020

(65) Prior Publication Data

US 2021/0176043 A1 Jun. 10, 2021

Related U.S. Application Data

(60) Provisional application No. 62/944,505, filed on Dec. 6, 2019.

(51) Int. Cl.
| | |
|---|---|
| *H04L 9/06* | (2006.01) |
| *H04L 9/32* | (2006.01) |
| *G06F 16/23* | (2019.01) |
| *G06F 21/64* | (2013.01) |
| *H04L 9/00* | (2022.01) |

(52) U.S. Cl.
CPC ........ *H04L 9/0637* (2013.01); *G06F 16/2379* (2019.01); *G06F 21/64* (2013.01); *H04L 9/32* (2013.01); *H04L 9/50* (2022.05)

(58) Field of Classification Search
CPC ...... H04L 9/50; H04L 9/3239; G06F 16/2379
See application file for complete search history.

(56) References Cited

U.S. PATENT DOCUMENTS

| | | |
|---|---|---|
| 4,309,569 A | 1/1982 | Merkle |
| 2016/0119134 A1 | 4/2016 | Hakoda |
| 2017/0213209 A1* | 7/2017 | Dillenberger ....... G06F 16/2322 |
| 2018/0131511 A1 | 5/2018 | Taylor |
| 2019/0251187 A1* | 8/2019 | Lin ..................... G06F 16/1834 |
| 2019/0375373 A1* | 12/2019 | Pepe ............... H04M 1/724098 |
| 2020/0112430 A1 | 4/2020 | Taylor |
| 2020/0134066 A1* | 4/2020 | Yegorin ................ H04L 9/0637 |

* cited by examiner

*Primary Examiner* — Olugbenga O Idowu
(74) *Attorney, Agent, or Firm* — Ellenoff Grossman & Schole LLP; Michael E. Shanahan

(57) ABSTRACT

The present invention provides a Multipath blockchain capability to verify blockchain data integrity based on transactions linked to entities that may be device-based or otherwise. Based on an entity's needs, in one embodiment, the Multipath blockchain capability enables the entity reading a block linked to the entity to directly point to only that entity's transactions. The entity's pointer to each path type may be associated with each data record. In an embodiment, each entity's transaction is a separate unit; not bundled with other entity's transactions. Each of these transactions or blocks may be linked to that entity's previous block. In effect, this allows each entity's transaction to point back to that entity's previous transaction to verify its truthfulness and allows separation of each of these entity's records into their own chain or subtree, thereby decoupling entity specific records form the entire blockchain, providing for improved security, and a decreased read and write times, and reduction in overall computational overhead associated with blockchain interactions.

20 Claims, 10 Drawing Sheets

200

BLOCKCHAIN DATA STRUCTURES AND SYSTEMS AND METHODS THEREFOR FOR MULTIPATH TRANSACTION MANAGEMENT

PRIORITY CLAIM

This application claims priority from U.S. provisional application Ser. No. 62/944,505 filed on Dec. 6, 2019, the contents of which are hereby incorporated by reference in its entirety.

BACKGROUND OF THE INVENTION

In cryptography, a cipher is typically an algorithm for performing encryption or decryption. This is usually a series of well-defined steps that can be followed as a procedure. An alternative, but less common term is encipherment. To encipher or encode is to convert information into cipher or code. In common parlance, "cipher" is synonymous with "code", as they are both a set of steps that encrypt a message; however, the concepts are distinct in cryptography, especially classical cryptography.

One type of cryptography scheme that has recently become popular is "blockchain" technology. A blockchain is generally understood as a growing list of records, called blocks, that are linked using cryptography. Each block typically contains a cryptographic hash of the previous block, a timestamp, and transaction data (generally represented as a Merkle tree).

By design, a blockchain is resistant to modification of its data. This is because once recorded, the data in any given block cannot be altered retroactively without alteration of all subsequent blocks. For use as a distributed ledger, a blockchain is typically managed by a peer-to-peer network collectively adhering to a predetermined and agreed to protocol for inter-node communication and validating new blocks. Although blockchain records are not unalterable, blockchains may be considered secure by design and exemplify a distributed computing system with high Byzantine fault tolerance. The blockchain are often described as "an open, distributed ledger that can record transactions between two parties efficiently and in a verifiable and permanent way."

A blockchain is a decentralized, distributed, and frequently public, digital ledger consisting of records called blocks that are used to record transactions across many computers so that any involved block cannot be altered retroactively, without the alteration of all subsequent blocks. This allows the participants to verify and audit transactions independently and relatively inexpensively. A blockchain database is managed autonomously using a peer-to-peer network and a distributed timestamping server. They are authenticated by mass collaboration powered by the collective self-interest of its subscribers. Such a design facilitates robust workflow where participants' uncertainty regarding data security is marginal. The use of a blockchain desirably removes the characteristic of infinite reproducibility from a digital asset. It confirms that each unit of value was transferred only once, solving the long-standing problem of "double spending." A blockchain has been described as a value-exchange protocol. A blockchain can maintain title rights because, when properly set up to detail the exchange agreement, it provides a record that compels offer and acceptance.

Blocks hold batches of valid transactions that are hashed and typically encoded into a Merkle tree. Each block includes the cryptographic hash of the prior block in the blockchain, linking the two. The linked blocks form a chain. This iterative process confirms the integrity of the previous block, all the way back to the initial block, which is known as the genesis block.

Sometimes separate blocks can be produced concurrently, creating a temporary fork. In addition to a secure hash-based history, any blockchain has a specified algorithm for scoring different versions of the history so that one with a higher score can be selected over others. Blocks not selected for inclusion in the chain are called orphan blocks. As a result, peers supporting the database have different versions of the history from time to time. Typically, they keep only the highest-scoring version of the database known to them. Whenever a peer receives a higher-scoring version (usually the old version with a single new block added) they extend or overwrite their own database and retransmit the improvement to their peers. There is never an absolute guarantee that any particular entry will remain in the best version of the history forever. Blockchains are typically built to add the score of new blocks onto old blocks and are given incentives to extend with new blocks rather than overwrite old blocks. Therefore, the probability of an entry becoming superseded decreases exponentially as more blocks are built on top of it, eventually becoming very low. For example, bitcoin uses a proof-of-work system, where the chain with the most cumulative proof-of-work is considered the valid one by the network. There are a number of methods that can be used to demonstrate a sufficient level of computation. Within a blockchain, the computation is carried out redundantly rather than in the traditional segregated and parallel manner.

By storing data across its peer-to-peer network, the blockchain eliminates a number of risks that come with data being held centrally. The decentralized blockchain may use ad hoc message passing and distributed networking.

Peer-to-peer blockchain networks lack centralized points of vulnerability that computer crackers can exploit; likewise, it has no central point of failure. Blockchain security methods include the use of public-key cryptography. A public key (a long, random-looking string of numbers) is an address on the blockchain. Value tokens sent across the network are recorded as belonging to that address. A private key is like a password that gives its owner access to their digital assets or the means to otherwise interact with the various capabilities that blockchains now support. Data stored on the blockchain is generally considered incorruptible.

Every node in a decentralized system has a copy of the blockchain. Data quality is maintained by massive database replication and computational trust. No centralized "official" copy exists and no user is "trusted" more than any other. Transactions are broadcast to the network using specific software applications. Messages are delivered on a best-effort basis. Mining nodes validate transactions, add them to the block they are building, and then broadcast the completed block to other nodes. Blockchains use various time-stamping schemes, such as proof-of-work, to serialize changes. Alternative consensus methods include proof-of-stake. Growth of a decentralized blockchain is accompanied by the risk of centralization because the computer resources required to process larger amounts of data become more expensive.

The "block time" is the average time it takes for the network to generate one extra block in the blockchain. Some blockchains create a new block as frequently as every five seconds. By the time of block completion, the included data becomes verifiable. In cryptocurrency, this is practically when the transaction takes place, so a shorter block time means faster transactions. The block time for Ethereum on average is between 14 and 15 seconds, while for bitcoin it is on average 10 minutes. Generally speaking, faster transactions are desirable (e.g., requiring less than 1 second).

In August 2014, the bitcoin blockchain file size, containing records of all transactions that have occurred on the network, reached 20 GB (gigabytes). In January 2015, the size had grown to almost 30 GB, and from January 2016 to January 2017, the bitcoin blockchain grew from 50 GB to 100 GB in size. The ledger size had exceeded 200 GB by early 2020.

Accordingly, the computational resources required to maintain the blockchain and verify transaction integrity increase substantially over time as the blockchain is used. This results in numerous undesirable consequences. One such consequence is the latency delay associated with updating the blockchain with a new entry as the blockchain grows. Other disadvantages include the processing resources required to perform such updates (and subsequent associated verification operations) as it propagates among the blockchain users. This involves not only a substantially commitment of substantial processing power but includes allocating processing bandwidth as well as an allocation of an ever-increasing amount of dedicated memory resources. And because of the cumulative nature of blockchain operations, this use of resources is experienced in connection with essentially every transaction that includes a read, write or verification operation on the blockchain.

Moreover, upon inspection of the blockchain entries, it is apparent that not all entries are necessarily required for all updates of verification operations. Moreover, any decrease in the read/write time associated with such operations would drastically decrease the use of system resources and speed of any update and/or verification calculations in an ever-increasing manner as the blockchain propagates, resulting an vastly improved data management paradigm and faster and more robust blockchain system.

SUMMARY OF THE INVENTION

It is therefore an object of the present invention to provide systems and methods for improved performance and/or management of blockchain transactions.

It is therefore also an object of the present invention to provide systems and methods that include improved data structures for the efficient management and/or interaction of blockchain-based systems.

It is therefore also an object of the present invention to provide systems and methods that reduce and/or improve the read and/or write time interaction with a blockchain data structure.

It is therefore also an object of the present invention to provide systems and methods that reduce and/or improve the size, amount or memory or processing overhead required to update, maintain and verify the integrity of transactions in a blockchain-based system.

It is therefore an object of the present invention to provide systems and methods that provide transaction-based linked data structures and management paradigms for blockchain-based systems.

It is therefore an object of the present invention to provide systems and methods that provide multipath data structures and management paradigms for blockchain-based systems.

It is therefore a further object of the present invention to provide systems and methods that provide multipath data structures that may include at least two path hashes that may be used in verifying data or path integrity.

These and other objects of the present invention are accomplished by providing methods, systems and apparatuses that, in one embodiment, allow a computer network system to create, organize, deploy and manage device interactions across one or more networks using a Multipath blockchain approach. By creating a Multipath link from each electronic device's current block back to the previous block of that electronic device block, each electronic device in effect has "two paths" that can be followed. One is the path back to the previous block written to the chain, i.e., using conventional blockchain technology, and the other path back to the previous block written by a particular device using device and/or transaction based path determination in accordance with the present invention. One way this may be accomplished is by using two path hash entries for each block, each hash representing different paths.

Using links such as hash entries back to other device specific transaction blocks, rather than using the entire blockchain, improves overall system efficiency by retrieving just specific device data by using links to show where that data is stored for the previous record of a particular device. In some embodiments, users or administrators may specify multiple such devices (rather than just one) to be included in a particular "custom" blockchain which is an improvement consistent with the goals of the present invention with respect to the use of the entire blockchain, but to a somewhat lesser degree depending on the number of devices included in such a custom grouping.

A typical blockchain can be thought of as a linked list, using hashes to designate what block came before, and the content of that block. The present invention provides a Multipath blockchain as a blockchain wherein, in accordance with an embodiment, each block has only one transaction, or each device's transaction is a separate unit; not bundled with other device's transactions. Once this is true, each of these transactions or blocks will be given a hash of that devices' previous block. In effect, this requires each device's transaction to point back to its previous transaction to verify its truthfulness and allows a user to separate each of these device's records into their own chain separate and apart from the entire blockchain.

To achieve efficiency in writing data, the Merkle state tree may be formed by having all or substantially all the records of a unique device in a unique branch of the tree, based on the device's public key and the device links. In this way, when a transaction is written, and a device's record is updated, the Merkle tree must rebuild only the hashes for that device's branch. Therefore a computing environment is created where electronic devices have "no interest" in other electronic device transactions or need to see other electronic device transactions, and enables the creation of a multipath link for each electronic device which enables a single electronic device to only check its own transactions, improving data security and privacy.

Additionally, these records which are held in the state, can be combined together if the number of unique records is large enough under a device's branch that the Merkle tree must compute a substantial number of hashes. This may be thought of as "nested" transactions. This keeps the amount of hashing to a minimum and improves the efficiency of writing to the blockchain. However, it will be understood in certain embodiments that a traditional "full blockchain" method may be used if desired, for example, as a fallback or recovery procedure if a question arises with respect to the security or veracity of transaction based blockchain.

Moreover, it will be understood that in some embodiments, users or administrators may specify multiple devices (rather than just one) to be included in a particular "custom" blockchain which is consistent with the goals of the present invention with respect to not needing the use of the entire blockchain, but to a somewhat lesser degree depending on the number of devices included in such a custom grouping.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which.

DETAILED DESCRIPTION OF THE INVENTION

Figure 1A:
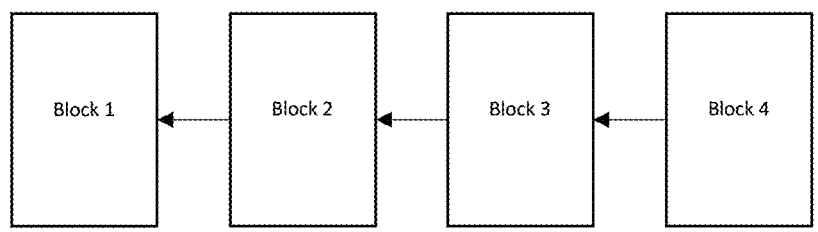
FIG. 1A is a generalized block diagram illustrating a typical example of traditional blockchain, where each new block points to the previous one.

Embodiments of the invention provide systems and methods of improving the performance of blockchain transactions (work) without compromising the fidelity of the transaction thereby reducing or eliminating the need for a blockchain Proof of Work or Proof of Stake Consensus Model. The systems and methods described herein may be used in a complimentary fashion with the solutions described in commonly assigned U.S. patent application Ser. No. 15/668,521 "Systems and Methods for Dynamic Cypher Key Management" and its progeny, referred to herein as "DCKM" which is hereby incorporated by reference in its entirety.

In general, DCKM establishes a methodology whereby when electronic devices may register themselves on a blockchain, and a "Trust Key" is created that is guaranteed to be substantially unique. Using such DCKM based paradigms, the present invention may alter the structure of a state based blockchain to separate device's data from any other device's data. The data separation in both state and block may serve to limit information access, and allow a device's transactions to form a chain, which is a subset of classic blockchain information, which may be referred to herein as a "path." Additional alterations in the structure of the state may result in changes regarding where data is saved in state, and the ability to segment and archive this data when needed. Such concepts are important to implementing aspects of the invention and represent elements of the invention of the disclosed invention.

Providing these features in a blockchain's state and block allow for improvements in the speed that a transaction may be performed during the execution of reading and/or writing to and from the block. For example, changes to the block structure (described in more detail below) allow for each device's transactions to be used as "individual paths" for each device, creating data separation which assists in the ease of parsing the data and a particular device's transaction history. This may also allow for each device's history to be treated as a chain in and of itself, thereby allowing the associated data to be verified based on this information alone, independent of other devices' histories. Such modifications of the state data structure as contemplated by embodiments of the invention therefore result in a faster reading and writing of data to state. One way this is accomplished is by reducing the amount of resources required for calculating a Merkel Tree hash to either mostly or exclusively the transactions a particular device has entered, and thereby substantially improving the reading time of a device's transaction or transaction history compared to prior art "unorganized state trees," which rely on a "brute force" omnibus calculations on the entire blockchain record rather than transaction-based verification as contemplated by embodiments of the present invention.

One aspect of the invention involves the use of Multipath blockchains and multipath blockchain interaction and management paradigms. Multipath blockchains can be implemented in numerous ways. Substantially any suitable multipath method and/or arrangement may be used if desired to achieve the goals of the present invention. For example, one way a multipath blockchain may be implemented includes by programmatically creating a blockchain from the beginning, or, alternatively, by using a pre-existing open source blockchain and implementing the desired aspects of the invention through the use of configuration controls or rules such as "smart contracts" or through modifications to the source code of a device using the blockchain.

By creating a Multipath link from each electronic device's current block back to the previous block of that electronic device, each electronic device in effect has "two paths" that can be followed. One is the path back to the previous block written to the chain, i.e., using conventional blockchain technology, and the other path back to the previous block written by a particular device using device and/or transaction based path determination in accordance with the present invention. One way this may been done by associating or placing two path hashes with each blockchain record, one for the traditional blockchain path and another for the device based "streamlined" path.

When using a pre-existing blockchain, preferred embodiments of the blockchain chosen should be able to support adding additional hashes for each device's path such as the device-based path. Additionally, the data structure of state should be able to be substantially controlled by the creator device. Data typically will be stored in a Merkle radix tree, with the ability to add, remove, and alter the "leaves" of the tree deterministically according to the rules specified in accordance with multipath systems and methods described herein.

Embodiments of the invention may alter, change and/or redefine standard blockchain state creation and management conventions, which specify how block and state structures are modified. These changes result in a reduced amount of work needed for calculating the Merkle tree hash and allows for better sequestration of device's data, resulting in both improved transaction speed and security.

A typical blockchain can be thought of as a dynamic linked list, using hashes to designate what block came before, and the content (payload) of that block. In one embodiment, according to aspects of the present invention, a Multipath blockchain may be used as a blockchain so long as the block structure allows each device's transaction is a separate unit; i.e., not bundled with other device's transactions. In some embodiments, each block may have only one transaction. Once this is true, each of these transactions or blocks will be given a hash of that device's previous block. This allows each device's transaction to "point back" to its previous transaction to: 1) verify its veracity and ensure data integrity, and 2) allow a user to separate each of these device's records into their own chain.

This ensures the authenticity and security of a data streams while eliminating the need to consider on the transactions of other devices and their associated Merkle tree leaf data structures which are substantially "unnecessary" or "irrelevant" to a particular device's transaction stream. In this way, transaction based blockchains are created that drastically reduce computational overhead for any given device while the maintaining the traditional protections associated with blockchain systems.

Turning now to FIG. 1A, a standard prior art blockchain 100 is shown wherein each subsequent block is dependent on the directly preceding block. For example, Block 2 is directly dependent on block 1 and block 4 is directly dependent on block 3 etc. regardless of what device the transaction of that block originated from.

Figure 1B:
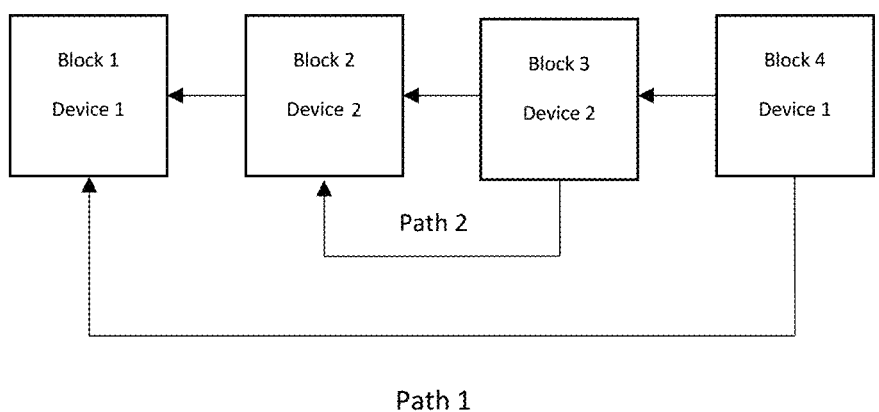
FIG. 1B is a generalized block diagram illustrating an example of a Multipath blockchain constructed in accordance with aspects of the present invention where each block points to both the previous block and to the past blocks from the same device.

Referring now to FIG. 1B, a basic embodiment of a Multipath blockchain 200 according to aspects of the invention is shown. In FIG. 1B, the concept of a device-based blockchain transaction record is illustrated. For example, as shown, Block 4 which originated from Device 1 now depends directly from both Block 3 and Block 1 (through Path 1) and has multiple paths (i.e., Multipath) that may be used to verify transaction integrity. However, there is an important distinction between the two paths. If Device 1 with Block 4 chooses to verify its data from immediately preceding Block 3 (a Device 2 record) it must rebuild the blockchain including information from Blocks 2 and 3 that include transaction records originating from Device 2. This not only makes the verification process slower, requiring more computational overhead and includes information regarding a different and likely unrelated Device 2.

However, if Device 1 with Block 4 chooses to verify its data from Block 1 (also Device 1 record) it can rebuild the blockchain using transaction information only from Block 1 and ignore the information from Blocks 2 and 3 that include transaction records from Device 2. This not only desirably makes the verification process faster, requiring less computational overhead, but excludes information regarding a different and likely unrelated Device 2. These benefits increase exponentially as the blockchain grows and more devices are added. For example, consider the case where the blockchain has a thousand registered devices. In this case, a data structure may be created that eliminates all but the relevant device in the transaction chain, obviating the need to process transactions from the remaining 999 devices. Nevertheless, the longer verification process using records from Device 2 (Blocks 2 and 3) may be used if desired, for example, if the Device 1 records are incomplete or corrupted ensuring transaction integrity.

One way this may be done is by placing or associating two path hashes with each block as described above. For example, as shown, Block 4 includes a path hash directly to Block 1 (Path 1) and another path to Block 3. Similarly, Block 3 may include a one path hash to Device 2 both "directly" and through Path 2. In this case, both path entries may be the same.

Separating the blockchain at a particular point in the chain may be known as "segmenting." Such segmenting may occur at substantially any desired point in the blockchain by a device desiring to reduce its computational overhead. Typically this is done on a device by device basis and may be based on code stored at that device, by global segmenting that may occur based on blockchain design, or predicated on the blockchain reaching a certain predesignated threshold as determined by the device owner or network system, in order to, for example, maintain a minimum operational speed. Such as threshold may be established when a read or write time exceeds a preset or adaptive threshold, or after a certain number of blocks is written for a particular device. Any such suitable performance metric may be used if desired. Such a feature may be desirable in time sensitive operations such as financial transactions or real time medical applications.

Figure 1C:
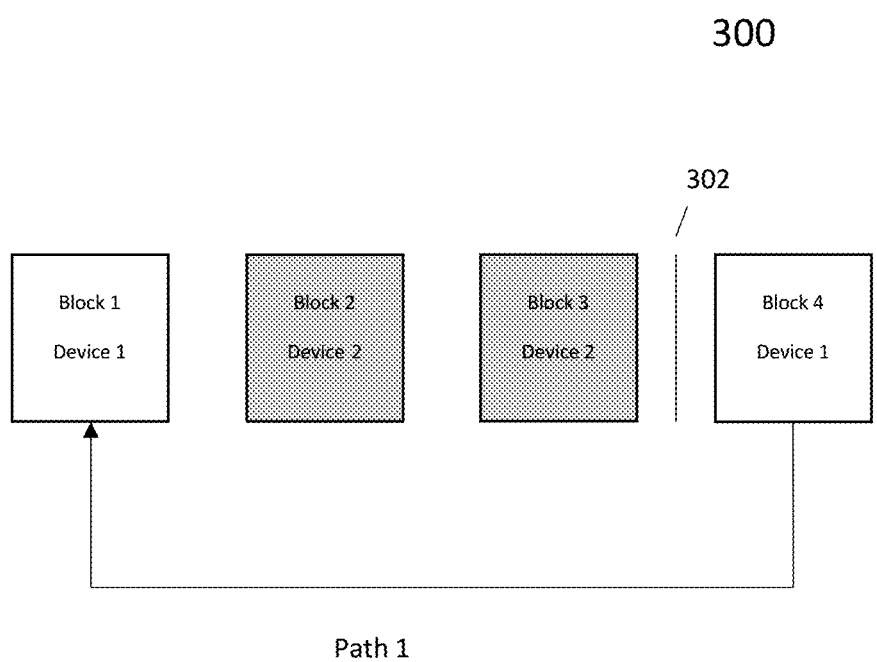
FIG. 1C is a generalized block diagram illustrating an example of a multipath blockchain constructed in accordance with aspects of the present invention showing block segmenting occurring at a particular point, with some blocks being archived using a device's path.

An example of such segmenting in a preferred embodiment of the invention is illustrated in blockchain 300 shown in FIG. 1C. As shown, segmentation point 302 may be implemented to remove the direct dependency of Block 4 on shaded Blocks 2 and 3, illustrated by the horizontal line, which are typically separated (e.g., transitioning from full-trace blockchain to device based blockchain), and only used when reconstituting the full blockchain. Blocks 1 and 4 in Path 1 maintain their direct dependency and become the preferred path for verification. Although the segmentation shown is based on Devices, any suitable qualifying criteria such as a filtering criteria may be used as desired to limit the number of qualifying entries in the streamlined blockchain. For example, qualifying criteria could be enterprise-based Devices, brand-based, Devices class of devices may be group together (e.g., cameras, control systems, utilities, security functions such as door locks, temperature sensors and controls) etc.

After segmenting, the separated transactions may be retained in one large record, through combination and/or nesting, with future transactions continuing to be written as normal. This is shown in FIGS. 3B-3C below. This keeps the amount of hashing to a minimum and allows all data to be kept "in state." By using a subtree with a small amount of transactions specific for each device, with a separate transaction history in accordance with aspects of the invention, a record which contains the total amount of data doesn't need to be rewritten for every transaction.

Figure 2A:
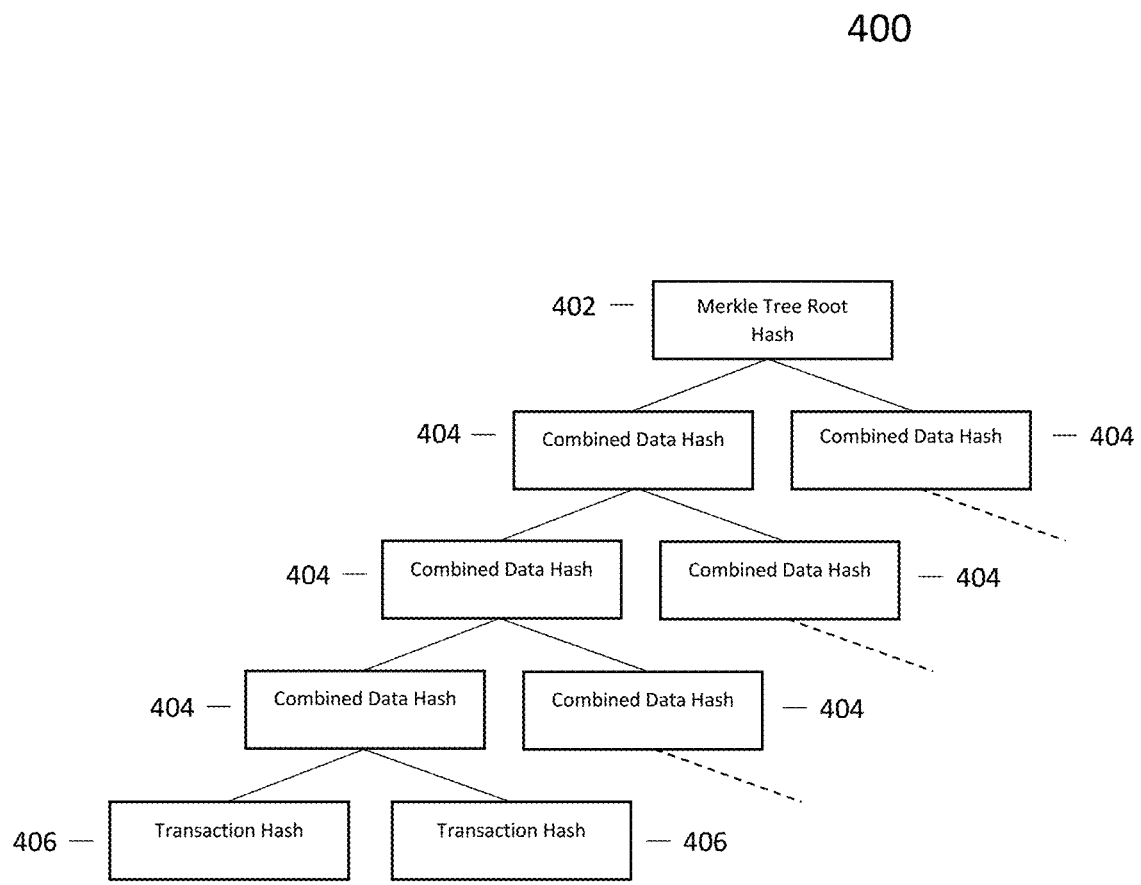
FIG. 2A is an illustrative example of how device transaction records may combine to form an unorganized prior art single Merkle tree.

In FIG. 2A, a standard prior art blockchain 400 is shown wherein each subsequent block is dependent on the directly preceding block. This is shown by the interrelationship of Merkle tree, which from top to bottom include Root hash 402, combined data hashes 404 and transaction hashes 406. In operation, Transaction hashes 406 combine to create Combined data hashes 404 (which may include left-hand side entries (not shown)) which then combine to form Root hash 402. FIG. 2A shows only the left most branch of Merkle tree 400, and for simplicity omits the redundant entries on the right-side of the tree, which typically would have the same branches as the left-hand side.

To achieve efficiency in writing data, the Merkle state tree of the present invention may be formed by having all the records of a device in a unique branch of the Merkle tree. In a preferred embodiment, each node of the tree may be labeled with a hexadecimal or other suitable character to differentiate between sibling nodes. Moving down the tree from root, and using these labels, a string may be built from the characters of each node. A string that is the same as a Device's public key will designate that section of the Merkle state tree as that Device's branch of the tree. Each device's branch has a subtree at the end of it, which is used to store each device's transactions.

In preferred embodiments, the branch of the tree used by a certain Device will be exclusively used by that Device. Therefore, when a transaction is written to state, the Merkle tree only must rebuild only the hashes for the transactions in a device's branch. This device's branch is then combined and organized with the others to form a global state in accordance with the invention, as shown in FIG. 2B (as opposed to the prior art shown in FIG. 2A which is an unorganized Merkle tree, where records are merely placed in order of creation).

Figure 2B:
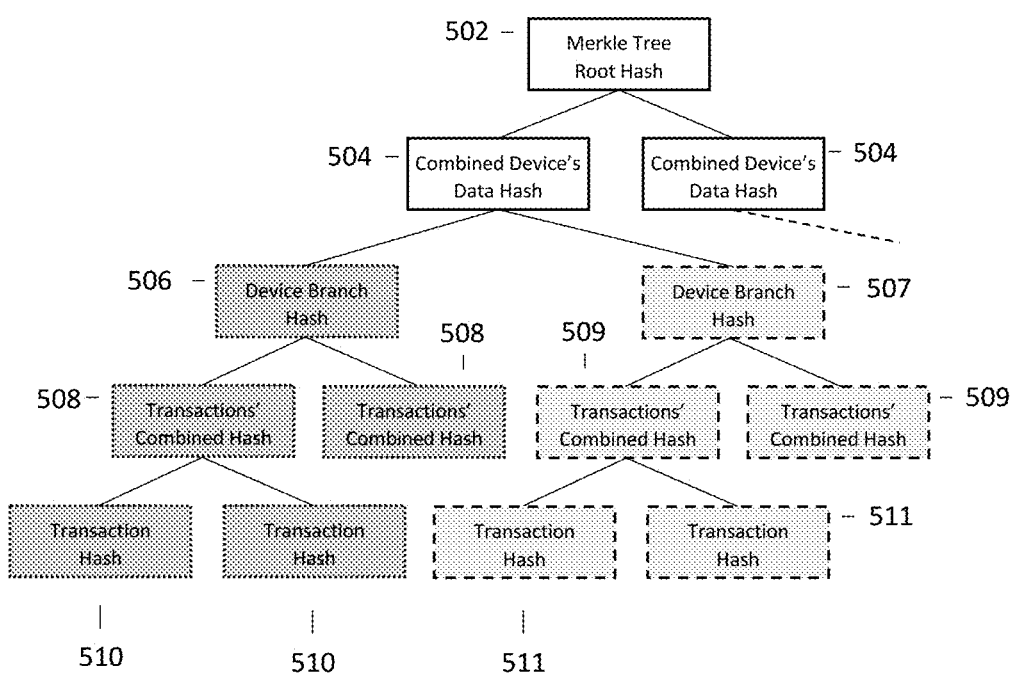
FIG. 2B is a generalized exemplary data structure illustrating the application of a multipath blockchain constructed and organized in accordance with aspects of the present invention wherein each device's branch has a different border and different shading, to indicate that they can be considered as separate subtrees.

In FIG. 2B, an embodiment of a Multipath blockchain 500 according to aspects of the invention is shown. In FIG. 2B, the concept of a device-based Multipath blockchain transaction record as applied to Merkle tree implementations is illustrated with an improved organizational structure of the invention. For example, as shown, the blocks on the left represent hashes based on Device 1, whereas the blocks on the right represent hashes from Device 2. This is shown by the interrelationship of Device 1—Branch hash 506, Transactions Combined hashes 508 and Transactions hashes 510—shown as dotted line boxes. Similarly, the blocks on the right represent hashes based on Device 2, is shown by the interrelationship of Device 2 Branch hash 507, Transactions combined hashes 509 and Transactions hashes 511—shown as dashed line boxes. Merkle Tree Root hash 502 and Combined Devices Data hashes 504 are common to the Merkle trees of both devices. This allows Device 1 and Device 2 to have separate "subtrees" and substantially independent and "standalone" blockchain branches. When decoding block chain records for both Device 1 and Device 2, Root hash 502 is typically used, which obviates the need for the use of many other blocks in the traditional chain as explained in more detail below.

Figure 3A:
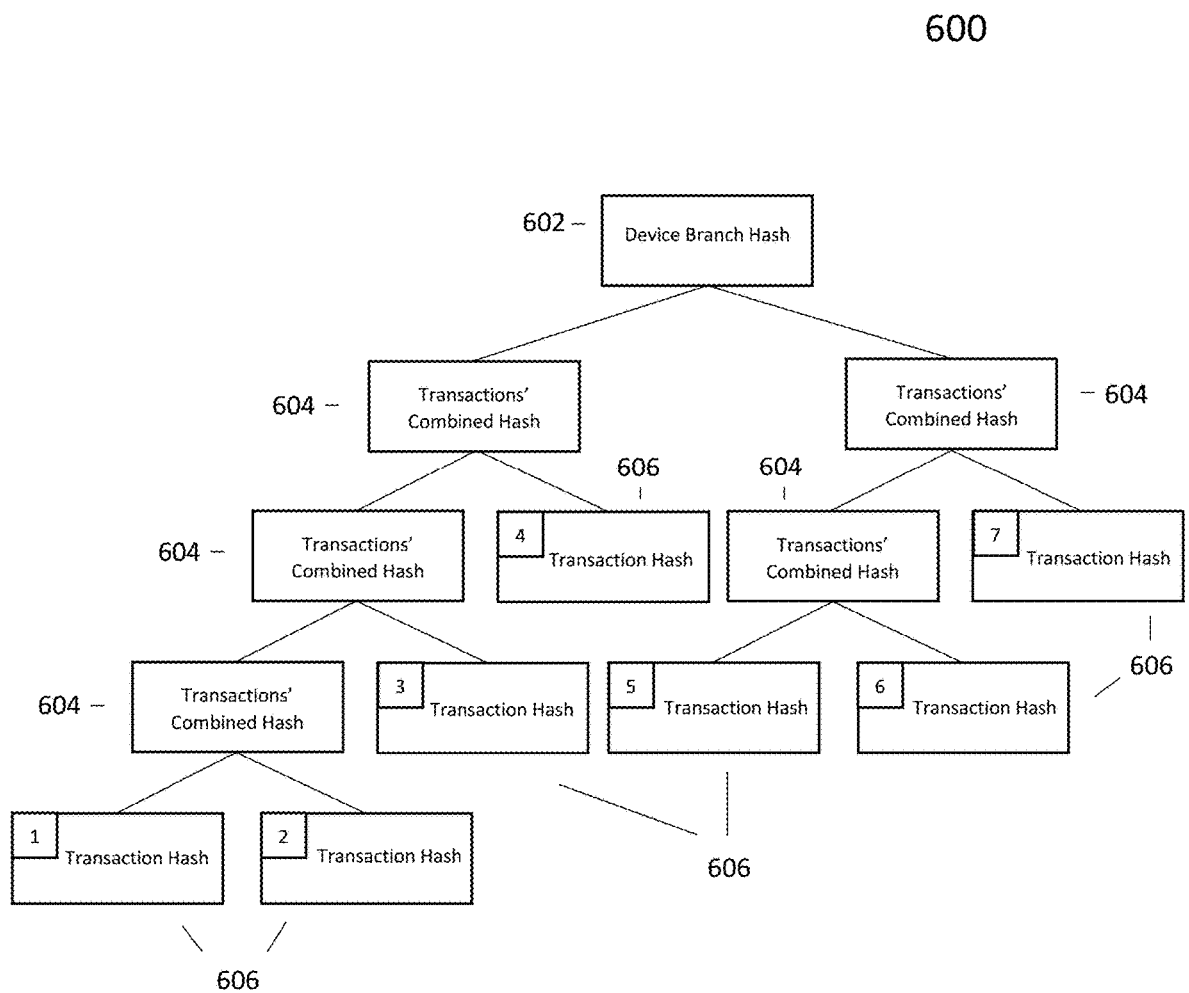
FIG. 3A is an illustrative example of how device transaction records in state are organized and combine to form a single branch hash in accordance with aspects of the Multipath design paradigms of the present invention.
Figure 3B:
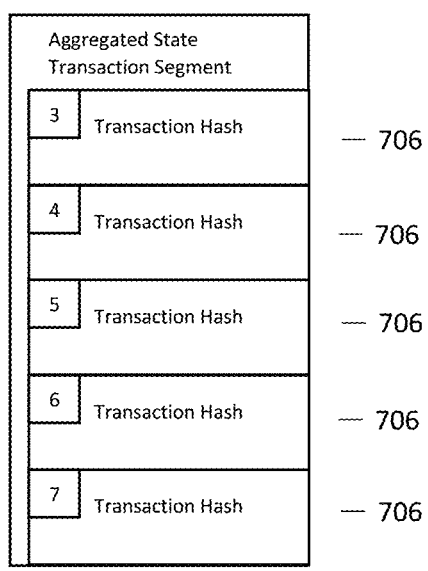
FIG. 3B is a generalized exemplary data structure illustrating the application of a Multipath blockchain constructed in accordance with aspects of the present invention showing how device transaction records in state can be organized and placed into one larger record in accordance with an embodiment.
Figure 3C:
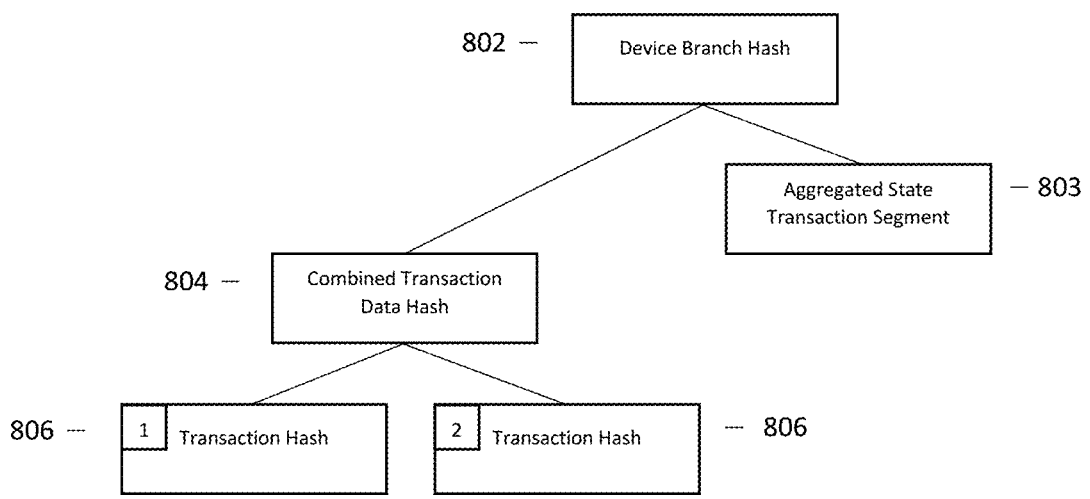
FIG. 3C is a generalized exemplary data structure illustrating aspects of the present invention wherein certain records in the segment are removed and replaced with the data structure shown in FIG. 3B.

In FIG. 3A, an embodiment of a Multipath blockchain 600 according to aspects of the invention is shown. In FIG. 3A, the concept of a device-based Multipath blockchain transaction records in state combine to form a single Device Branch hash 602 is illustrated. Device Branch hash 602 represents substantially the same point as Device Branch hashes 506 or 507 shown in FIG. 2B. It will be understood however, that FIG. 3A represents a subtree for only one Device. In this illustration, dependency paths are shown between Transactions Combined hashes 604 and Transaction hashes 606. In preferred embodiments, each block typically contains a cryptographic hash of the previous block, a timestamp, and transaction data. As shown, Device 1 has seven transaction records in one state illustrated as blocks 1-7 in the upper left-hand corner of each transaction hash.

Each Device dependency and verification may be determined from its own Device path subtree or from use of the entire blockchain record shown for both devices. Use of device subtree verification is preferred as less computationally intensive.

However, it is not necessary that the Datapath structure shown in FIG. 3A be maintained as shown. Much of the state based records and information may be "reorganized" or "removed" from blockchain 600 and its associated local dependencies which are used to verify transaction for Device 1, and stored and/or arranged in a more efficient data structure such as the one shown in FIG. 3B—data structure 700. Such as data structure may be thought of as an Aggregated State Transaction Segment (ASTS) for one more Devices other than the immediately present device. For example, as shown, the state records that relate to Device 2 may be "nested" in data structure 700 where all of the path entries are hashed together as one data record. In this way, verification and blockchain updates for Device 1 occur more swiftly and use less resources, by requiring fewer repetitive hashing calculations that are obviated by data structure 700.

It will be understood that the nesting or combining technique shown in FIGS. 3B and 3C need not necessarily be combined with the Multipath techniques described herein and, if desired may be used on traditional blockchain systems and data structures and "standalone" fashion.

If the number of records included in Device's branch or subtree passes a certain preset or adaptive threshold, based, for example, on desired performance characteristics, they may be combined to reduce the amount of individual hashing and/or decoding required. In some embodiments, this threshold may be met when the time required to hash the transactions in the traditional Merkle tree is slower than the speed of hashing in a more "sparse tree" such as tree 800 constructed in accordance with aspects of the invention (described below). A Device with a complicated branch of transactions 600 is shown in FIG. 3A. This requires a larger number of hashes to calculate than compared to a similar structure 800 after nesting or combining of hashes in accordance with aspects of the present invention.

FIG. 3B shows Transaction hashes 706, which are substantially the same has Transaction hashes 606 including transactions 3 through 7 being combined or nested into one leaf using segmenting to form data structure 700. Data structure 700 may be constructed in any suitable way that achieves the intent the invention. For example, as shown, it may be formed as a dynamic linked list (DLL) connecting the nested data entries together in sequential or dependency-based form. Such entries may exist for example in any suitable file or data management system for actually or virtually nesting or otherwise combining blockchain entries.

FIG. 3C shows the branch in FIG. 3A after nesting entries 2-7 into data structure 700 (shown as ASTS block 803). This change reduces the number of transactions, and consequently the number of hashes to complete. FIG. 3C illustrates one example of how a device based Merkle tree data structure 800 may appear after nesting Device data. In a preferred embodiment, Device Transactions Hash 802 typically includes all of the relevant information to decode and verify transaction for Device 1 (and, in some embodiments transactions of other Devices). Combined Transactions hash

804 and Transactions hash 806 are substantially the same as their counterparts 604 and 606 in FIG. 3A After segmenting, the nested transactions may be retained in Aggregated State Transaction Segment (ASTS) 804 as one large or "global" record, and future transactions continue to be written as normal. This keeps the amount of hashing to a minimum and allows all data to be kept "in state." By using a subtree as shown in FIG. 3C, with a small amount of transactions for the Device, with a separate archived transaction history, a record which contains the total amount of data doesn't need to be rewritten for every transaction.

Figure 4A:
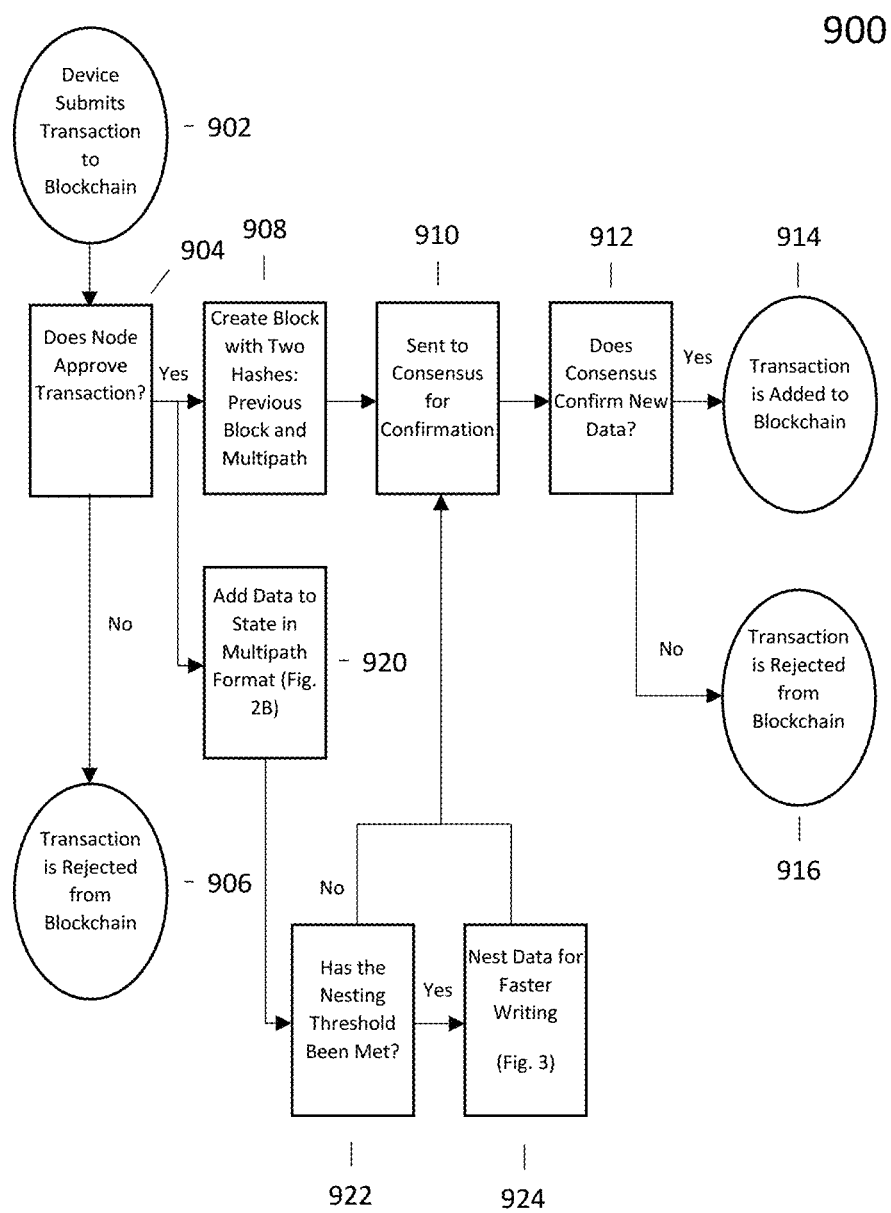
FIG. 4A is a flowchart illustrating some of the steps associated with adding a transaction to a Multipath blockchain in accordance with an embodiment of the invention.

FIG. 4A is a flowchart 900 illustrating some of the steps for adding a transaction to a multipath blockchain in accordance with an embodiment of the invention.

Figure 4B:
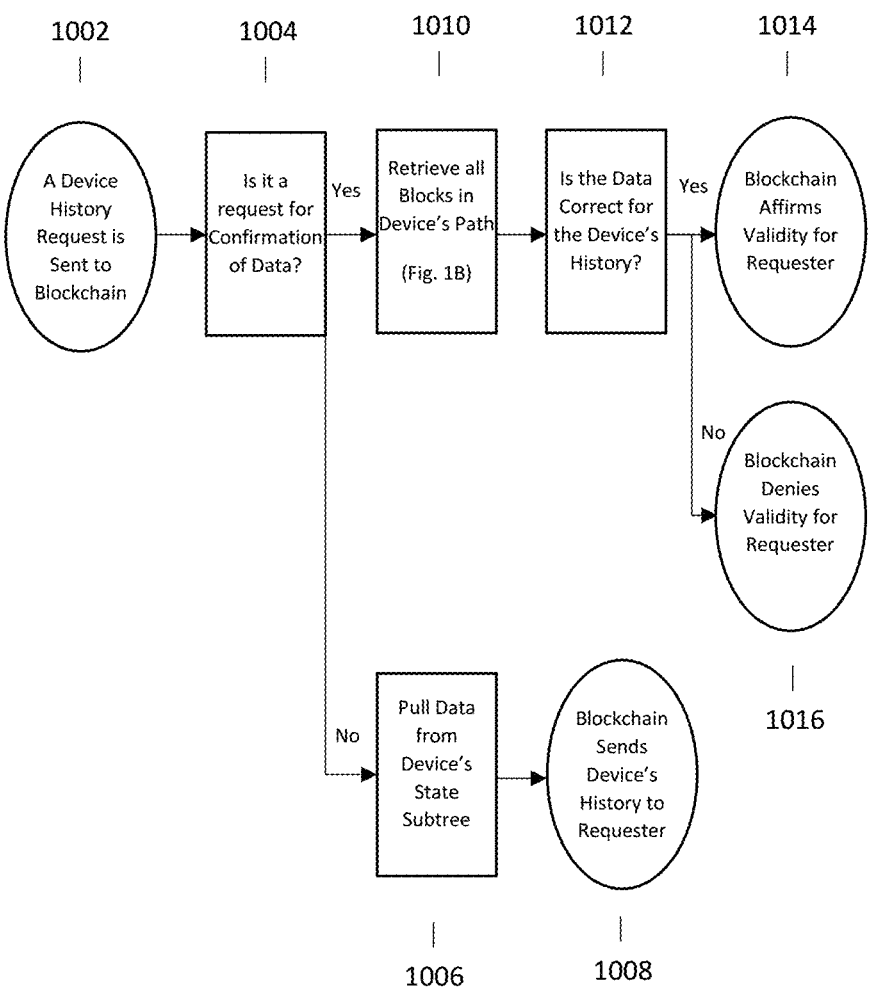
FIG. 4B is a flowchart illustrating some of the steps associated with retrieving or confirming data from a multipath blockchain in accordance with an embodiment of the invention.

FIG. 4B is a flowchart 1000 illustrating some of the steps involved for retrieving or confirming data from a multipath blockchain in accordance with an embodiment of the invention.

Referring now to FIG. 4A flowchart 900 is shown. At step 902, data is provided to a device in the form of a transaction which represents data to be added to the blockchain, that may be owned by a particular Device and may, follow a format which is readable to the blockchain. Once sent to the blockchain the node may determine if the transaction is legitimate (step 904). In some embodiments, this may be simple, either verifying that a public key encryption is valid, or in other embodiments, more complex, such as determining if a device is sending data which itself is logically consistent or faulty. If the transaction is illegitimate, it is rejected from the blockchain (step 908). If approved, the transaction may go to two places. The transaction data may packaged into a block, with a hash of the previous block created on the blockchain, and a hash of the block previously written by a device. This establishes the multipath link for a device (step 920). The transaction data may also be processed by the state of the blockchain and placed onto a branch of the Merkle tree for that device, as shown in FIG. 2B (step 920). If the nesting threshold is reached (step 922) the transaction data may be combined as shown in FIGS. 3A-C (step 924). After the transaction data is processed, it should be accepted by enough nodes in the blockchain to pass consensus (step 910). This typically means that this process is checked or repeated on enough other nodes to confirm the legitimacy of the data (step 912). Once this is done the data may be accepted and is formally written to the blockchain (step 914). If, however, the transaction is not verified by consensus it is rejected and not included in the blockchain (step 916).

Turning now to FIG. 4B, which describes some of the steps involved with retrieving, reading, or confirming data. First a request for a device's history may be sent to a node in the blockchain (step 1002). That node may determine if the request wants the data of the device's history, or if it wants to confirm the device's history (step 1004). If confirmation is desired—the node may first access the blocks on the chain connected to the multipath link, as shown in FIG. 1B (step 1010). Once accessed, the node may determine if the data on the interconnected nodes are correct, and/or the hashing is accurate (step 1012). If it is correct, the system confirms the veracity to the requester (step 1014) and access to transaction data is granted, and if not, access is denied (1016). At step 1004, if there hasn't been a request for confirmation, but instead a request for the data, the node pulls the data from the device's state subtree (step 1006). Then the node sends this data to the requester (step 1008).

It will be understood that aspects of the present invention may be embodied in any suitable form. One such embodiment may include, a non-transitory computer readable medium including computer readable instructions, which when executed by one or more computer processor cause the one or more computers to implement the Multipath blockchain described herein. This includes instructions that allow for at least two paths for the reconstruction and verification of transaction record data and integrity.

Such instructions may include instructions to create a blockchain that allows for the implementation of Device based segmentation points as described in connection with FIGS. 1C, 2B and the creation of organized data structures such as those described in connection with FIGS. 3B and 3C.

Such instructions may include instructions to modify a pre-existing a blockchain that allows for the implementation of Device based segmentation points as described in connection with FIGS. 1C and 2B and the creation of organized data structures such as those described in connection with FIGS. 3B and 3C.

Such instructions may further selectively create and manage Device based segmentation points based on, pre-existing requirements, user preferences, network management needs or requirements that specify a maximum threshold for block time updates or maximum blockchain size.

It will be understood all the foregoing instructions may be Device based, and therefor dependent on that Device's performance and operation capability. Thus, certain devices may have somewhat different segmentation point specifics in order to achieve the goals of the present invention.

In other embodiments such instructions may be network or transaction requirement based and therefore only devices that have qualifying performance criteria may be added to the blockchain system. For example, those meeting minimum speed requirements for financial, medical and/or security implementations, etc.

Thus, as can be seen from the above, the present invention provides improvements to prior art blockchain systems including improved or new data structures which enable data separation, improve reading and writing speeds for state, and provide organizational structure with the multipath design that improves both the speed and robustness by way of a new and efficient primary blockchain path with an alternate traditional "fallback" path. The disclosed multipath design in blocks improves separation of data. Each device can form its own chain, giving a self-confirmed history of transactions, and the ability to separate those transactions quickly and efficiently from substantially all "other" transactions on the blockchain. These transactions can then be used to verify a Device's transaction history as accurate, without necessarily needing any transactions from outside of the path. This also allows for improved privacy and security, as a Device will not need to look at other Device's transaction history, allowing for private and secure transaction histories.

One improvements provided by the invention's Multipaths in a blockchain's state include increased reading and writing speed. Such improvements to writing speed comes in many ways. Each device may have a subtree, limiting the hashing calculations for any addition to the state to hashing a subtree of the state tree with respect to particular device, reducing the amount of time needed to apply these changes up the rest of the tree. Segmenting transactions limits the amount of leaves that need to be added to a subtree. This maintains verification reliability requiring a low number of hashes that need to be calculated. This low number of hashes is useful as it means a lower number of hashing calculations needed for writing to state, lowering the writing time. By maintaining the transactions in a subtree, instead of one record that contains all of the transactions, the present invention does not need to employ the entire full-trace transaction record from memory, such as a hard drive, which needs to be hashed and calculated every time a new transaction is added.

Reading speeds are also substantially faster, as the data required is simple to find, as opposed to an unorganized Merkle tree or block that would need to be searched through to find the needed data. With a device's data localized to one branch in accordance with an embodiment, searching through a smaller tree is an easier task, and in combination with the data in that tree being organized as described herein, such searching is accomplished much faster.

Moreover, it will be understood the invention described herein may implemented with, in or in addition to the solutions described in commonly assigned U.S. patent application Ser. No. 15/668,521 "Systems and Methods for Dynamic Cypher Key Management" and its progeny, including, but limited to, the disclosure relating to the use of DCKM technology in general and to the steps involved in establishing the unique private blockchain in conjunction with FIG. 4 of that disclosure.

It will be understood that these systems and methods disclosed herein are merely illustrative and are not meant to be comprehensive or necessarily performed in the order or exact fashion shown. Persons skilled in the art will appreciate that the present invention can be practiced by other than the described embodiments, which are presented for purposes of illustration rather than of limitation, and the present invention is limited only by the claims which follow.

What is claimed is:

1. A method of creating a Multipath blockchain verification system for a plurality of devices across the Internet or other network environment comprising:
   modifying a full-trace electronic blockchain to accept one or more verification path entries or confirming the pre-existing full-trace electronic blockchain accepts additional verification path entries;
   establishing a segmentation point in the full-trace electronic blockchain;
   creating a device-based path based on the full-trace blockchain with reference to the segmentation point;
   maintaining dependencies for the full-trace blockchain such that at least one device in the plurality of devices has at least two paths for verifying blockchain record integrity, a first verification based on the full-trace blockchain and a second verification based on the device based path.

2. The method of claim 1 further comprising nesting blockchain records.

3. The method of claim 1 further comprising establishing a threshold at which the segmentation point is created.

4. The method of claim 3 wherein the threshold is adaptive.

5. The method of claim 3 further comprising establishing the segmentation point when the first verification path would take longer to verify than the second verification path.

6. The method of claim 5 wherein blockchain records further comprise combining portions of the full-trace electronic blockchain records in an Aggregated State Transaction Segment.

7. The method of claim 5 wherein a dual pointer structure is associated with the blockchain records that maintains dependencies from the full-trace electronic blockchain records.

8. The method of claim 1 wherein the device may choose to verify blockchain record integrity from the full-trace electronic blockchain records or the specific device based path based on computational efficiency.

9. The method of claim 8 wherein the device may choose to verify blockchain records based on a transaction requested.

10. The method of claim 9 wherein the request is for either the device-based path or the full-trace blockchain.

11. The method of claim 1 wherein a device from the plurality of devices may verify blockchain record integrity from the full-trace blockchain when the device-based path is unreliable or unavailable.

12. The method of claim 1 wherein full-trace electronic blockchain is created rather than modified or confirmed such that the full-trace electronic blockchain supports multipath data structures.

13. A non-transitory computer readable medium including computer readable instruction, which when executed by a computer processor cause the computer to:
   modify a full-trace electronic blockchain to accept one or more verification path entries or confirming the full-trace electronic blockchain accepts additional verification path entries, thereby creating a Multipath blockchain verification system for a plurality of devices across the Internet or other network environment;
   establish a segmentation point in the full-trace electronic blockchain;
   create a device-based path with reference to the segmentation point;
   maintain the full-trace blockchain such that the device has at least two paths for verifying blockchain record integrity, a first verification path based on the original pre-existing blockchain and a second verification path based on the device-based.

14. The non-transitory computer readable medium of claim 10, including computer readable instructions, which when executed by a computer processor cause the computer to nest certain blockchain records.

15. The non-transitory computer readable medium of claim 10, including computer readable instructions, which when executed by a computer processor cause the computer to establish a threshold at which the segmentation point is created.

16. The non-transitory computer readable medium of claim 12, including computer readable instructions, which when executed by a computer processor cause the computer to establish the threshold at a point where the full-trace electronic blockchain would take longer to verify than the device-based path.

17. The non-transitory computer readable medium of claim 12, wherein when executed by a computer processor cause the computer to create a dual pointer structure associated with the blockchain records that maintains dependencies from the full-trace blockchain records.

18. The non-transitory computer readable medium of claim 12, wherein when executed by a computer processor cause the computer to choose to verify blockchain record integrity from the full-trace blockchain or the device-based path based on computational efficiency.

19. The non-transitory computer readable medium of claim 12, wherein when executed by a computer processor cause the computer to verify blockchain record integrity from the full-trace pre-existing blockchain records when the device-based path unreliable or unavailable.

20. The non-transitory computer readable medium of claim 12, wherein when executed by a computer processor cause the computer to create a full-trace electronic blockchain rather than modify or confirm a pre-existing full-trace electronic blockchain such that the full-trace electronic blockchain supports multipath data structures.

\* \* \* \* \*